H. A. THOMAS.
Corn-Planters.

No. 154,531.   Patented Aug. 25, 1874.

Witnesses:
W. J. Payton
A. H. Norris

Inventor:
H. A. Thomas
By James L. Norris
Atty.

UNITED STATES PATENT OFFICE.

HANFORD A. THOMAS, OF POTOSI, ILLINOIS.

IMPROVEMENT IN CORN-PLANTERS.

Specification forming part of Letters Patent No. 154,531, dated August 25, 1874; application filed December 12, 1873.

*To all whom it may concern:*

Be it known that I, HANFORD A. THOMAS, of Potosi, in the county of Livingston and State of Illinois, have invented certain new and useful Improvements in Corn-Planters, of which the following is a specification:

The object of this invention is to provide a corn-planting mechanism by the use of which corn may be planted in straight and uniform rows without the common preliminary operation of marking off the ground. The invention consists in mounting the axle carrying the spoke or star wheels in slotted bearings, to render it vertically self-adjusting, and providing the same with a fixed collar or hub having tappet-arms, which operate a disk on the shank of an adjustable arm vertically pivoted to a vertical rock-shaft, said shaft having a rearwardly-projecting plate connected by a link or rod to a pivoted lever attached to the seed-dropping slide, in such a manner that when the axle revolves the tappet-arms strike alternately on the disk, and thus rotate the vertical shaft, which vibrates the projecting plate on its upper end, and, through the link and lever attached to the seed-dropping slide, imparts a reciprocating motion to the same, all of which will be fully hereinafter described.

Figure 1:
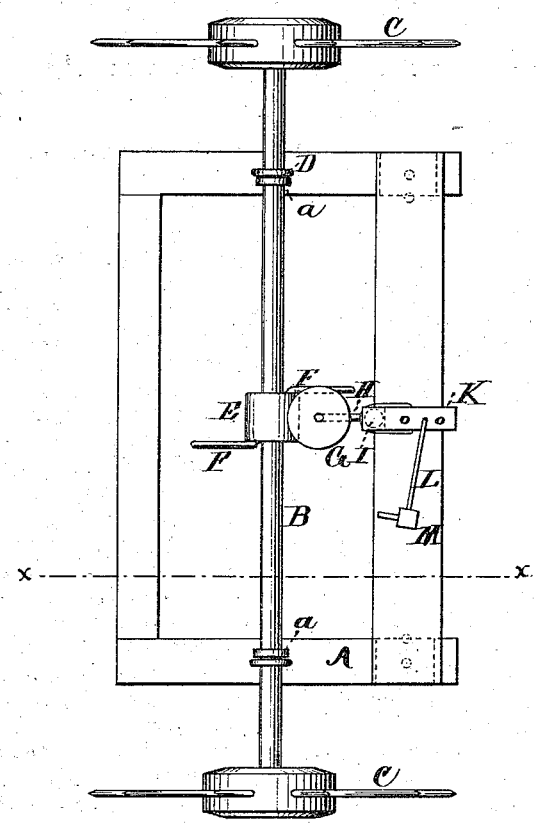
Figure 2:
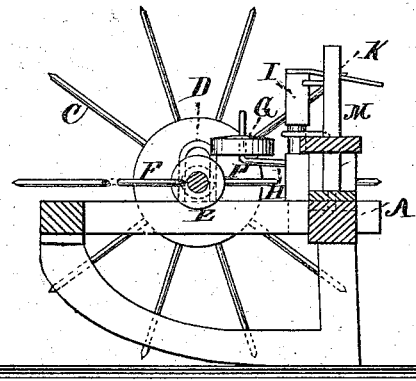

In the accompanying drawings, Figure 1 is a plan or top view of a corn-planter embodying my invention. Fig. 2 is a cross-section of the same, taken through the line *x x* of Fig. 1.

A designates the frame of an ordinary corn-planter, or as much of the same as is necessary to show the relative arrangement of my attachments for operating the seed-dropping slide. B is a shaft or axle extending transversely across the frame, and having mounted upon its ends a pair of spoke-wheels, C C, which are formed by inserting a series of spokes or arms radially into a hub, as shown. The shaft B is fitted or inserted into slotted bearings or guides D D, which may be simple long staples driven into the frame, or slotted castings, attached by means of a flange, may be resorted to for the purpose. Collars or shoulders *a a* are applied to the shaft B in proper relation to the slotted guides, for preventing the lateral movement of said shaft. The spoke-wheels are revolved, as will be perceived, by causing their points to engage with the ground as the planter is drawn along, and, as the nature of the soil differs, provision must be made for causing the wheels to revolve at a uniform speed, whether the spokes enter the ground to a greater degree in soft soil or lesser degree in hard soil; and for accomplishing this result I employ the vertically self-adjusting axle, which rises or falls in conformity with the nature of the soil. The spoke-wheels should be of such a size as to make two movements of the dropping-slide to one revolution; but they may be large enough to make three or four. At the central portion of the shaft B there is located a fixed hub or collar, E, to the sides of which are attached two tappet-arms, F, extending in opposite directions, as shown, and engaging with a disk or head, G, applied to an upwardly-bent shank of a crank-arm, H, which is pivoted or jointed at its rear end to a vertical rock-shaft, I. Said rock-shaft is journaled in staples or eyes applied to the central portion of the planter-frame, and is provided at its upper end with a rearwardly-extending plate or arm, K, which is, by means of a link or rod, L, connected to the upper or free end of a pivoted lever, M. The lower end of said lever is stepped or inserted into the seed-slide, which is of the usual form, being generally provided with a seed-pocket at each end. The spoke or arm K may be provided with several holes to enable the link or rod L to be adjusted, so as to obtain a corresponding longer or shorter stroke of the dropping-lever.

The rotary movement of the spoke-wheel shaft will cause the tappet-arms to strike or engage with the disk carried by the pivoted arms of the rock-shaft, thus alternately turning the same in opposite directions, and obviously transmitting a reciprocating motion to the seed-slide through the medium of the lever and connecting-link.

The pivoted arm carrying the disk is so disposed in relation to the tappet-arms that when the spoke-wheels rise said arm will be correspondingly moved, always maintaining the disk in a proper co-operative relation to the tappets. The disk itself may, in certain cases, be made to rise or fall to a sufficient extent for accomplishing the latter result.

A dropping attachment for planters constructed as above described is simple in construction, convenient in use, and effective in operation, and withal easily attached to any of the ordinary planters now in use, which is of great advantage, as will be obvious.

It will be understood that the hub of the spoke-wheels may be composed of two sections, provided with seats or grooves on their inner surfaces for the reception of the spokes, and the latter may also be formed with bent shanks at their lower or rear ends, which are to be inserted into holes in the hub-sections, so as to retain the spokes firmly in place.

What I claim as new, and desire to secure by Letters Patent, is—

The axle B, mounted in slotted bearings to render it vertically self-adjusting, and carrying the spoke-wheels C C, and collar or hub E, having tappet-arms F, in combination with the disk G on the adjustable arm H of rock-shaft I, the arm K, link L, and lever M, connected to the seed-dropping slide, all operating substantially as described.

In testimony that I claim the foregoing I have hereunto set my hand this 15th day of November, 1873.

HANFORD A. THOMAS.

Witnesses:
K. L. THOMAS,
O. M. HEFNER.